UNITED STATES PATENT OFFICE.

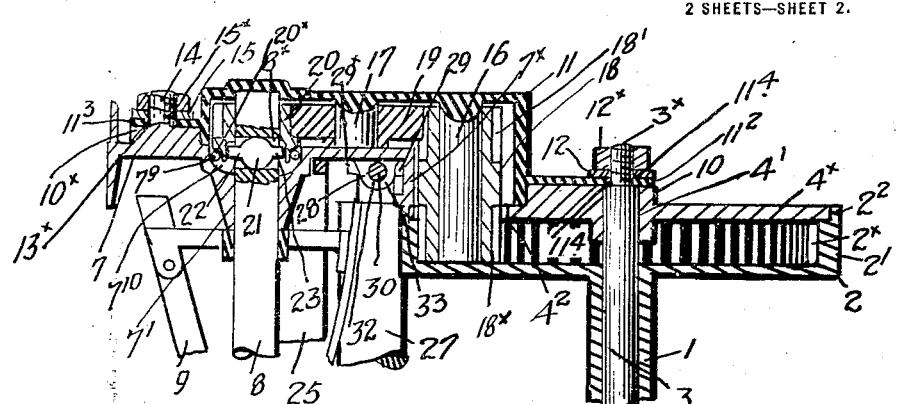

WILLIAM GEORGE ARMSTRONG, OF TORONTO, ONTARIO, CANADA.

LAWN-MOWER.

1,284,555.   Specification of Letters Patent.   Patented Nov. 12, 1918.

Application filed March 16, 1918. Serial No. 222,960.

*To all whom it may concern:*

Be it known that I, WILLIAM GEORGE ARMSTRONG, of the city of Toronto, in the county of York, in the Province of Ontario, Canada, have invented certain new and useful Improvements in Lawn-Mowers, of which the following is the specification.

My invention relates to improvements in lawn mowers and the object of the invention is to so construct the mower as to prevent marking of a cut lawn with parallel stripes, which stripes are caused by the pressing down of the uncut grass beneath the driving wheels of the mower and the consequent prevention of the cutting of this pressed down grass which thereby gives the appearance of parallel stripes on the lawn and a further object is to provide easy means which can be readily gotten at for making adjustments to those parts of the mower which are in need of adjustment from time to time and it consists essentially of the following arrangement and construction of parts as hereinafter more particularly explained.

Fig. 4, is a sectional plan of the parts shown in Fig. 1.

Fig. 5, is a perspective detail of the main casting on which the cutting blades and driving gear connecting such cutting blades to the main drive are carried.

Fig. 6, is a perspective detail of the ledger plate or stationary plate with which the revolving blades of the mower co-act.

Fig. 7, is a perspective detail of the driving pinion carried by the supporting shaft of the mower blades.

In the drawings like letters of reference indicate corresponding parts in the various figures.

Figure 1:
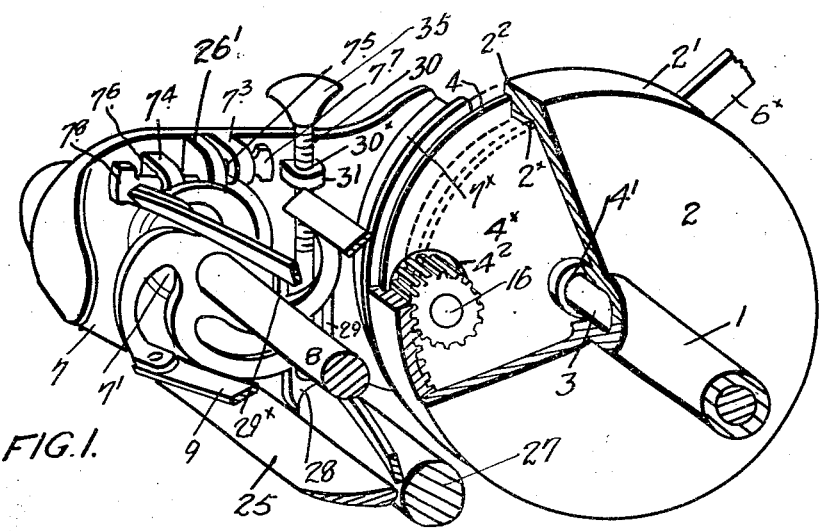
Figure 1, is a sectional perspective view of one end of a lawn mower constructed in accordance with my invention.
Figure 2:
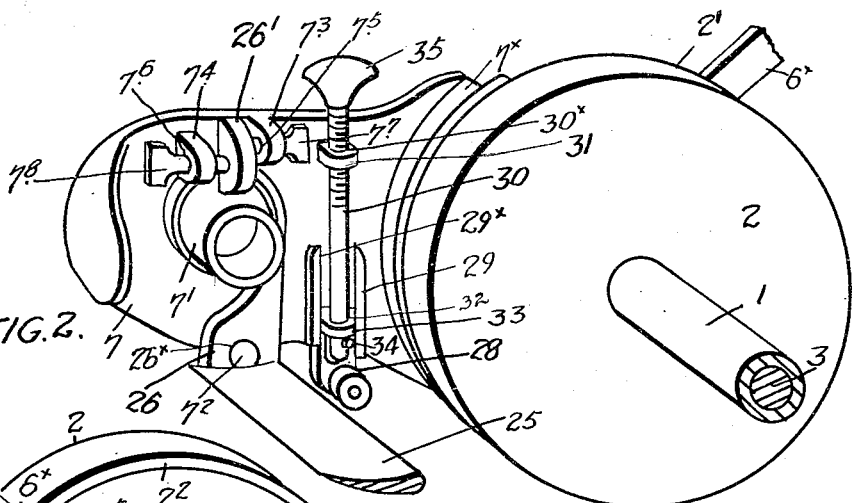
Fig. 2, is a similar view to Fig. 1, showing the cutting blades of the mower removed.

It will be understood that both ends of the mowing machine are the same in construction and I have, therefore, for this reason only shown in the drawings one end of the machine.

1 indicates a sleeve. 2 indicates a hollow gear member provided with an internal gear $2^x$ which is formed integral with the sleeve 1. 3 indicates a rod which extends through the sleeve 1 and is provided with threaded reduced ends $3^x$. The flange $2'$ of the hollow gear 2 on which the internal gear $2^x$ is formed is provided with an extended annular flange $2^2$ forming an annular internal recess.

4 indicates the main supporting casting which comprises a circular plate member $4^x$ which fits within the annular recess formed by the flange $2^2$. The plate $4^x$ is provided with a central orifice $4'$ through which the reduced portion $3^x$ of the rod 3 extends. The plate $4^x$ is also provided with an orifice $4^2$ in proximity to its outer periphery. $4^3$ indicates a lug which extends from the outer face of the plate $4^x$ and is provided with a tapered portion $4^4$ and an outwardly directed tongue extension $4^5$.

Figure 3:
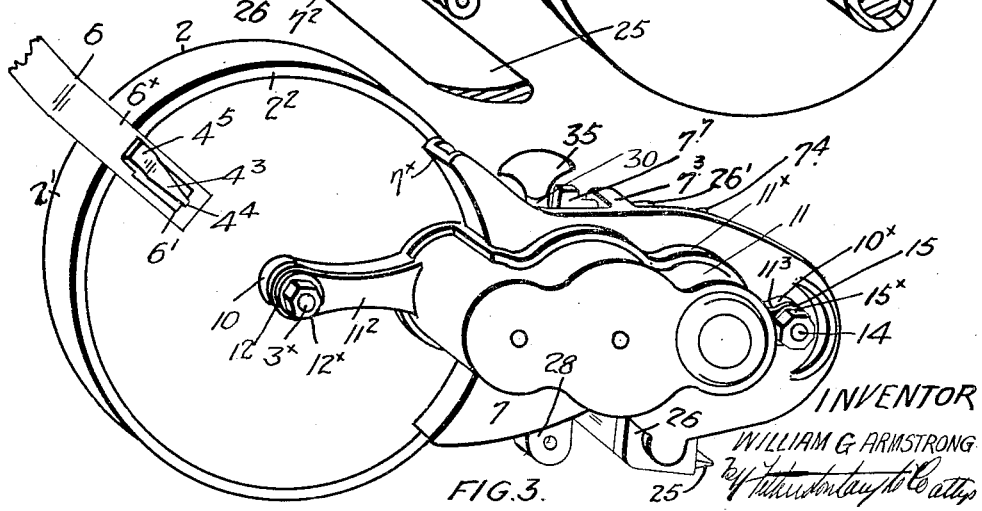
Fig. 3, is a perspective view of the parts shown in Fig. 2, looking from the opposite side.

6 indicates the handle of the lawn mower which may be of any ordinary construction, the arms $6^x$ of which are provided in proximity to their ends with rectangular orifices $6'$ into which the lug $4^3$ fits as clearly shown in Fig. 3, permitting of a slight rocking movement of the handle 6.

7 indicates a bearing member which extends forwardly from the plate $4^x$ and is offset therefrom at $7^x$. The bearing member 7 is provided with a hollow conical boss $7'$ provided at its outer side or in the outer face of the bearing member 7 with a recess $7^{10}$ forming an internal race for the ball $7^9$.

8 indicates the supporting shaft of the mower blades 9, the mower blades 9 being constructed in the usual manner, the ends of the blades, however, extending in front of the driving wheels 2. The ends of the shaft 8 extend into the bosses $7'$ as clearly indicated in Fig. 4.

10 indicates an enlargement formed on the outer face of the plate $4^x$ and $10^x$ indicates a corresponding enlargement formed on the outer face of the bearing member 7. 11 indicates a gear case which fits at its edges into the surrounding flange $11^x$ formed integral with the plate $4^x$ and bearing member 7. The ends of the gear case 11 are provided with outwardly extending alined tongues $11^2$ and $11^3$. The tongue $11^2$ is provided with an orifice $11^4$ through which the reduced end $3^x$ of the rod 3 extends.

12 indicates a washer carried by the portion $3^x$ and $12^x$ indicates a securing nut which is screwed on to the portion $3^x$ against the washer 12 thereby holding the tongue member 11² securely against the boss 10. 14 indicates a threaded stud which extends from the boss 10ˣ. 13ˣ indicates an orifice formed in the tongue 11³ through which the threaded stud 14 extends. 15 indicates a washer carried by the portion 14. 15ˣ indicates a securing nut which is screwed upon the stem 14 against the washer 15 thereby securely holding the tongue 11³ against the boss 10ˣ. 16 indicates a stud which extends from the gear case centrally through the orifice 4². 17 indicates a stud which extends from the gear case 11 intermediately between the center of the stud 16 and the center of the shaft 8 carrying the cutting blades 9.

18 indicates a double gear pinion, the inner portion 18ˣ thereof meshing with the internal gear 2ˣ of the driving gear 2. The outer portion 18′ of the double gear 18 extends into the gear case 11 and meshes with the pinion 19 carried by the stud 17. 20 indicates a pinion carried by the shaft 8 carrying the mower blades. The pinion 20 meshes with the pinion 19. The pinion 20 is provided at its inner portion with a ball race 20ˣ opposing the ball race 7¹⁰ and between which and the ball race 7¹⁰ the balls 7⁹ are held. The shaft 8 in proximity to each end is provided with a diametric slot 8ˣ in which is held a disk member 21 provided with diametrically extending lugs 22 and 23. 24 indicates an internal ratchet formed in the pinion 20 and with which the tongues 22 and 23 engage, the circular portion 21 rocking within the slot 8ˣ as the lugs 22 and 23 are carried in and out of engagement with the face of the teeth of the ratchet 24. By this means a driving connection is formed from the main driving gear through the double pinion 18, pinion 19 and pinion 20 to the shaft 8 of the mower. By this construction it will be seen that as the mower is pushed over the surface of the lawn that the blades will come in contact with the uncut grass in front of the main driving wheels before such main driving wheels have any chance to press the grass down and, therefore, the parallel markings or striped appearance given to the surface of the lawn is prevented.

25 indicates the ledger plate, which is provided with end arms 26 having an orifice 26ˣ. The arm 26 extends upwardly and is curved around the conical boss 7′ hereinbefore described, the upper end being provided with a lug member 26′ extending outwardly at right angles to the bearing plate 7. 7² indicates a boss which extends outwardly from the bearing member 7 into the orifice 26ˣ thereby forming a swinging support for the ledger plate. 7³ and 7⁴ indicate lugs extending inwardly from the bearing member 7. The lugs 7³ and 7⁴ are provided with internally threaded orifices 7⁵ and 7⁶. 7⁷ and 7⁸ indicate set screws, which bear against the opposite faces of the lug 26′.

By adjusting the screws 7⁷ and 7⁸ in alternate directions the front edge of the ledger plate 25 is adjusted so as to carry it nearer to or farther away from the path of the cutting edge of the revolving blades 9 of the mower.

27 indicates the mower roller, which is journaled in the adjustable bracket 28, the edges of which slidably fit into the undercut grooves of the guide strips 29 and 29ˣ which are carried by the bearing member 7. 30 indicates a threaded stem extending through the internally threaded orifice 30ˣ formed in the lug 31 extending from the inner face of the bearing member 7. The lower end of the stem 30 extends freely through the orifice 32 formed in a lug 33 extending from the bracket 28. 34 indicates a pin extending diametrically through the lower end of the stem 30 so as to retain it within the orifice 32 of the lug 33. The upper end of the stem 30 is provided with a suitable handle 35 by which the same may be turned. By turning the stem the thread thereof engages with the internally threaded orifice of the lug 31 thereby vertically adjusting the stem, and carrying up with it the bracket 28 and the mower roller carried thereby.

From this description it will be seen that I have devised a very simple construction of lawn mower by which the striping of a lawn is prevented due to strips of grass being left to a certain extent uncut, such grass being pressed downward upon the surface of the lawn by the driving wheels of the mower before coming into contact with the cutting blades of the mower.

By my construction the mower blades are carried in advance of the main driving gears and, therefore, cut the grass immediately in front thereof before such driving gears reach it thereby overcoming a difficulty which has hitherto been encountered.

Also by my construction the adjustment of the ledger plate 25 and roller 27 is easily accomplished by means readily gotten at, the adjusting medium being located clear of the cutting blades of the mower thereby preventing any danger of the operator inadvertently moving the mower and turning the cutting blades while making adjustments and thereby accidentally cutting his hand.

What I claim as my invention is—

1. In a lawn mower the combination with side supporting plates, and a rotary cutter journaled therein, of a ledger plate having vertically disposed arms at the ends thereof pivotally connected to the side plates below the axis of the cutter, said arms extending upward to the top of the side plates, and horizontally disposed opposed adjusting screws carried by said side plates adjacent the top edges thereof and engaging said arms, whereby the ledger plate may be adjusted and locked in its adjusted position from the upper side of the mower.

2. In a lawn mower having side supporting plates provided with suitable bearings, and a rotary cutter journaled therein, a ledger plate having vertically disposed arms at its ends pivotally connected to the side plates below said bearings, said arms having curved portions extending around said bearings and terminating above the same, and horizontally disposed adjusting screws carried by said plates above the bearings and bearing against opposite sides of said arms.

WILLIAM GEORGE ARMSTRONG.

Witnesses:
M. EGAN,
R. MOFFAT.